United States Patent [19]

Ohta

[11] Patent Number: 5,293,366
[45] Date of Patent: Mar. 8, 1994

[54] INFORMATION RECORDING AND REPRODUCING APPARATUS PROVIDED WITH MEANS FOR ADDING TO A TRACKING SIGNAL OFFSET CORRESPONDING TO THE POSITIONAL DEVIATION OF A RECORDING SPOT AND A REPRODUCING SPOT

[75] Inventor: Shinichi Ohta, Tokyo, Japan

[73] Assignee: Canon Kabushiki Kaisha, Tokyo, Japan

[21] Appl. No.: 46,519

[22] Filed: Apr. 16, 1993

Related U.S. Application Data

[63] Continuation of Ser. No. 733,165, Jul. 19, 1991, abandoned.

[30] Foreign Application Priority Data

Jul. 27, 1990 [JP] Japan ................................. 2-196104

[51] Int. Cl.$^5$ ............................................. G11B 7/00
[52] U.S. Cl. ........................... 369/44.31; 369/44.33; 369/44.38
[58] Field of Search ................ 369/44.33, 44.37, 109, 369/110, 44.23, 111, 112, 44.41, 44.32, 44.26, 44.24, 44.35, 44.36, 44.31, 44.38

[56] References Cited

U.S. PATENT DOCUMENTS

| | | |
|---|---|---|
| 3,876,842 | 4/1975 | Bouwhuis . |
| 3,914,595 | 10/1975 | Tinet ...................... 250/202 |
| 4,023,033 | 5/1977 | Bricot et al. . |
| 4,539,665 | 9/1985 | Iso et al. ............... 369/44.37 |
| 4,633,455 | 12/1986 | Hudson .................. 369/44.37 |
| 4,703,408 | 10/1987 | Yonezawa et al. ...... 369/109 |
| 4,831,613 | 5/1989 | Kanda .................... 369/109 |
| 4,841,514 | 6/1989 | Tsuboi et al. .......... 369/44.37 |
| 4,959,822 | 9/1990 | Pasman et al. ......... 369/109 |
| 5,031,165 | 7/1991 | Fujita .................... 369/44.23 |

*Primary Examiner*—Andrew L. Sniezek
*Assistant Examiner*—Nabil Hindi
*Attorney, Agent, or Firm*—Fitzpatrick, Cella, Harper & Scinto

[57] ABSTRACT

An apparatus for effecting the recording and reproduction of information on an information track on a recording medium, includes a device for applying a first light spot to the information track to thereby record information, a device for applying a second light spot to the information track to thereby reproduce the information, a device for moving the recording medium relative to the first and second light spots in the lengthwise direction of the information track, a detector for detecting a tracking signal from the reflected light of the second light spot by the recording medium, a tracking controller for moving the first and second light spots in the tracking direction orthogonal to the lengthwise direction of the information track in conformity with the tracking signal, and a device for providing to the tracking signal an offset corresponding to the positional deviation between the center of the first light spot and the center of the second light spot in the tracking direction, during the recording of the information. A method of effecting the recording and reproduction of information by the use of the apparatus described above is also provided.

47 Claims, 11 Drawing Sheets

$$\delta = \frac{\ell_1 + \ell_2}{2}$$

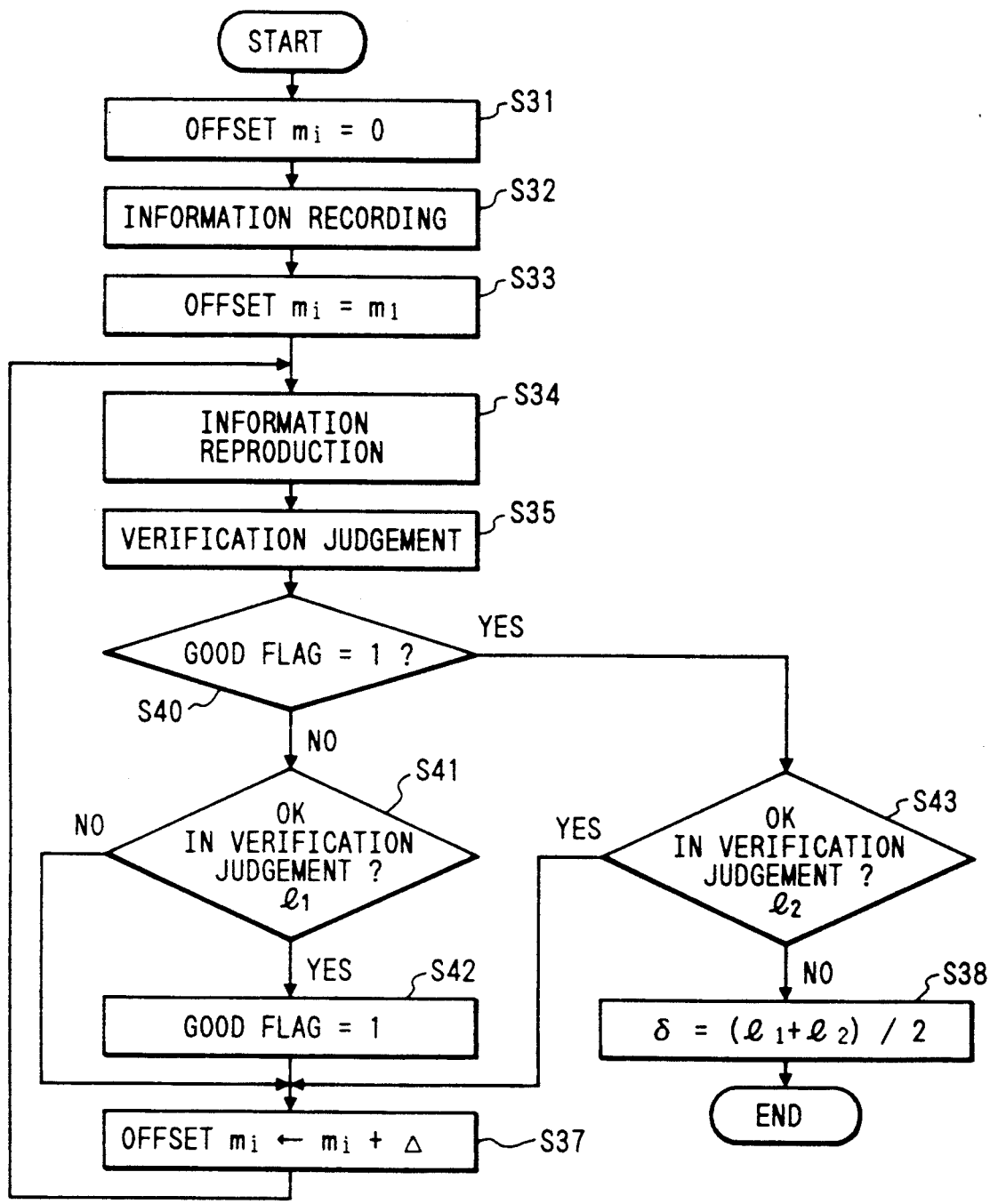

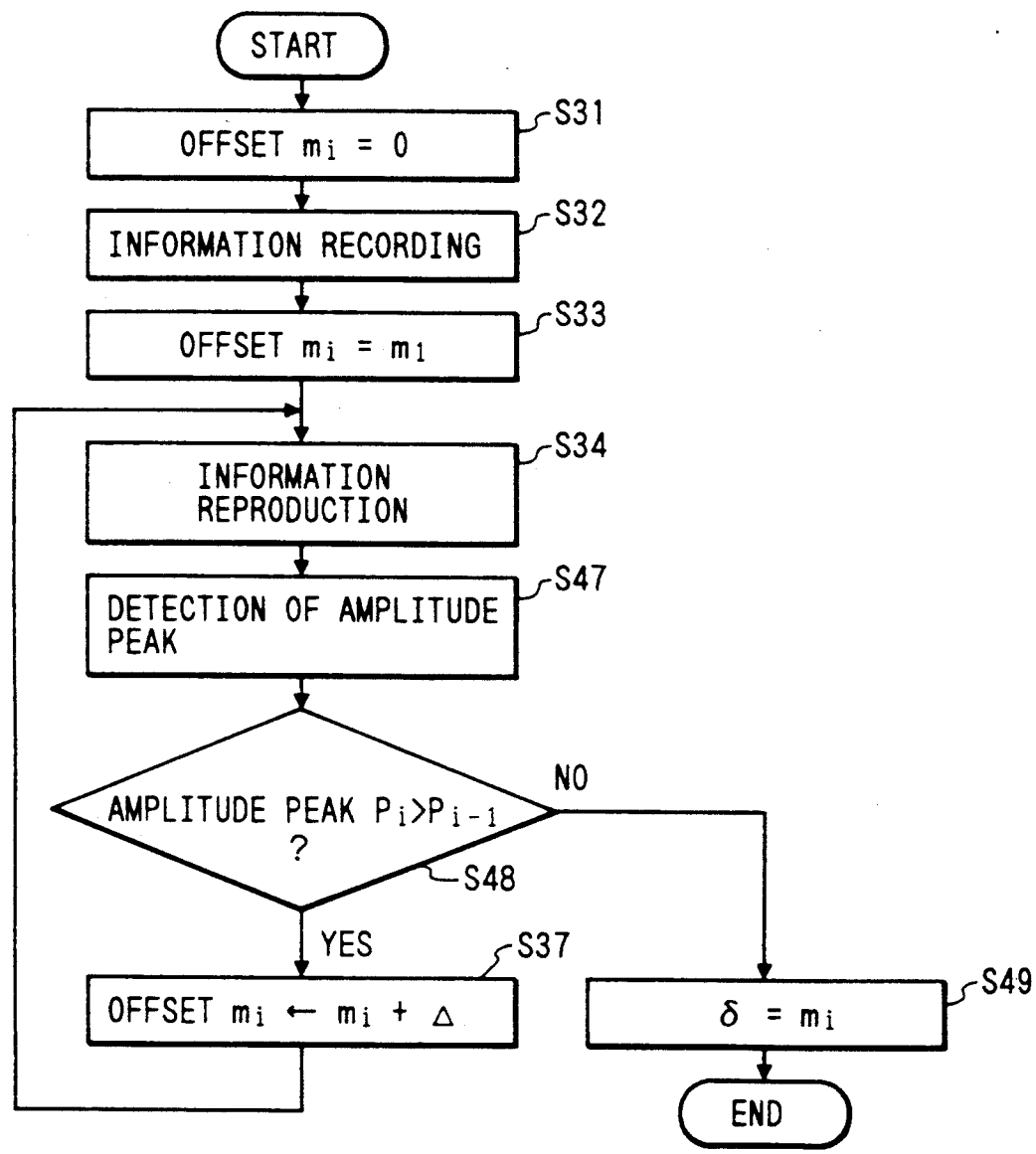

INFORMATION RECORDING AND REPRODUCING APPARATUS PROVIDED WITH MEANS FOR ADDING TO A TRACKING SIGNAL OFFSET CORRESPONDING TO THE POSITIONAL DEVIATION OF A RECORDING SPOT AND A REPRODUCING SPOT

This application is a continuation, of application Ser. No. 07/733,165 filed Jul. 19, 1991, now abandoned.

BACKGROUND OF THE INVENTION

1. Field of the Invention

This invention relates to an apparatus for scanning tracks on a recording medium with a light spot while effecting tracking control, thereby accomplishing the recording and reproduction of information.

2. Related Background Art

Various media such as a disk-like medium, a card-like medium and a tape-like medium are known as forms of medium on which information is recorded by the use of light and from which the recorded information is read out. These optical information recording media include media capable of recording and reproduction and media capable of reproduction alone. Particularly, an optical card as a recording medium is expected to be extended because of its ease of manufacture, its good portability, its good accessibility, etc. There have been proposed various optical information recording and reproducing apparatuses to which the optical card is directed.

In an optical information recording and reproducing apparatus, recording and reproduction are effected while auto tracking and auto focusing control is always effected. Also, the recording of information onto a recording medium is accomplished by scanning an information track with a light beam modulated in accordance with recording information and stopped down into a minute spot, and information is recorded as an optically detectable information pit row. The reproduction of information from a recording medium is accomplished by scanning the information pit row of the information track with a light beam spot having such a degree of predetermined power that recording is not effected on the medium, and detecting light reflected from or transmitted through the medium.

A single-light-source system and a plural-light-source system have been proposed as such information recording/reproducing systems. The typical construction of the single-light-source system is shown in FIG. 1 of the accompanying drawings.

In the apparatus of FIG. 1, a light beam emitted from a semiconductor laser 101 is made into a parallel light beam by a collimator lens 102, and this parallel light beam is divided into a plurality of light beams by a diffraction grating 103, and the plurality of light beams are condensed on an optical card 107 through a polarizing beam splitter 104, a quarter wavelength plate 105 and an objective lens 106. The reflected light from the optical card 107 passes through the objective lens 106, the quarter wavelength plate 105, the polarizing beam splitter 104 and a toric lens 108 to a photodetector 109. At this time, recording, reproduction and auto focusing control (hereinafter referred to as AF) are effected by the use of 0-order diffracted light of the light beams divided by the diffraction grating 103, and auto tracking control (hereinafter referred to as AT) is effected by the use of ±1st-order diffracted light. The so-called astigmatism method as described, for example, in U.S. Pat. No. 4,023,033 can be used for AF. Also, the so-called three-beam method as described, for example, in U.S. Pat. No. 3,876,842 is used for AT.

FIG. 2A of the accompanying drawings is a schematic plan view of an optical card. The optical card 107 has a number of information recording and reproducing tracks arranged parallel thereon, and some of the tracks are designated by T1, T2 and T3. These tracks are partitioned by tracking tracks tt1–tt4. The tracking tracks tt1–tt4 are formed by regions or grooves differing in reflectance from the tracks T1–T3, and are used as guides for obtaining a tracking signal. FIG. 2A shows an example in which information is recorded on or reproduced from the track T3. In this example, 0-order diffracted light 110 for recording, reproduction and AF is applied onto the track T3 and ±1st-order diffracted light 111 and 112 for AT are applied to the tracking tracks tt3 and tt4. A tracking signal which will be described later is provided by reflected light from the diffracted light 111 and 112 of the tracking tracks tt3 and tt4, and the 0-order diffracted light 110 properly scans the track T3. The diffracted lights 110 and 111 scan the optical card from left to right as viewed in FIG. 2A by a mechanism, not shown, while keeping the same positional relation. This scanning system includes a system for moving the optical system and a system for moving the optical card. In any case, the optical system and the optical card effect relative reciprocal movement and therefore, portions which are not constant in velocity are created at the opposite ends of the optical card.

This state is shown in FIG. 2B of the accompanying drawings.

The horizontal axis of FIG. 2B represents the left to right direction of the optical card, and the vertical axis represents the scanning velocity. Usually, the constant speed region in the central portion of the optical card 107 is used as a recording region.

FIG. 3 of the accompanying drawings is an enlarged view of portions of the diffracted light 110–112 of FIG. 2A. The 0-order diffracted light 110 for recording, reproduction and AF is situated in the middle between the ±1st-order diffracted light 111 and 112 for AT, and scans the center of the track T3. Hatched portions 113a, 113b and 113c indicate examples of the recording by the 0-order diffracted light 110 and are generally called pits. The pits 113a, 113b and 113c differ in reflectance from the surroundings thereof and therefore, when they are scanned by the light spot 110 of weak intensity after recording, the reflected light of the 0-order diffracted light 110 is modulated by the pits 113a, 113b and 113c, whereby there is obtained a reproduction signal.

FIG. 4 of the accompanying drawings shows the details of the photodetector 109 shown in FIG. 1 and a signal processing circuit. The photodetector 109 comprises four-division optical sensors 114 and optical sensors 115, 116, i.e., a total six optical sensors. Also, light spots 110a, 111a and 112a represent the reflected light of the diffracted lights 110, 111 and 112, respectively, in FIGS. 2A and 3. The light spot 110a is condensed on the four-division optical sensors 114, and the light spots 111a and 112a are condensed on the optical sensors 115 and 116, respectively. The sensor outputs of the four-division sensors 114 in the diagonal directions thereof are summed by addition circuits 117 and 118, respectively. The outputs of the addition circuits 117 and 118 are summed by an addition circuit 121 and provide an information reproducing signal RF. That is, the signal corresponds to all of the light spot 110a condensed on the four-division optical sensors 114. Also, the outputs of the addition circuits 117 and 118 are subtracted by a differential circuit 120 and provide a focusing control signal Af. That is, the signal Af is the difference between the sums of the four-division optical sensors 114 in the diagonal directions thereof. This astigmatism system is described in detail in the aforementioned U.S. Pat. No. 4,023,033. The outputs of the optical sensors 115 and 116 are subtracted by a differential circuit 119 and provide a tracking control signal At. Control is usually effected so that this signal At may be zero.

Designated by 111a and 112a are the reflected lights of the ±1st-order diffracted lights 111 and 112 in FIG. 3 as previously described. If the diffracted light 111 and 112 overlap with the tracking tracks tt3 and tt4, respectively, at the same rate, the light spots 111a and 112a will be of the same quantity of light. Accordingly, if control is effected so that the tracking control signal At may be zero, the 0-order diffracted light 110 will be situated the middle between the tracking tracks tt3 and tt4.

Turning back to FIG. 3, if the scanning loci of the 0-order diffracted light 110 during recording and during reproduction differ from each other, that is, if tracking deviates, the contrast of the signal RF and the time width of the pit portion may sometimes fluctuate and the reproduction of information may become impossible. Such a condition occurs due to the, vibration of the apparatus or dust on or a flaw on the optical card 107. It also occurs due to the residual when recording and reproduction are effected by discrete apparatuses. Particularly, in the case of the single-light-source system, recording and reproduction are effected by light spots of the same size and therefore, information cannot sometimes be reproduced even if the deviation between the tracking for recording and the tracking for reproduction is slight. Thus, the single-light-source system can be the to be small in the margin of tracking. Also, the diffracted light 110, 111 and 112 differ greatly in power between the pit recording period and the non-recording period and the light spots 110a, 111a and 112a likewise vary, and this has led to the problem of affecting AF control and AT control.

SUMMARY OF THE INVENTION

It is an object of the present invention to solve the above-noted problems peculiar to the prior art and to provide an information recording and reproducing apparatus which improves the accuracy of tracking control during recording and during reproduction and makes stable reproduction of information possible.

An apparatus for effecting the recording and reproduction of information on an information track on a recording medium which achieves the above object of the present invention comprises:

means for applying a first light spot to the information track to thereby record the information;

means for applying a second light spot to the information track to thereby reproduce the information;

means for moving the recording medium relative to the first and second light spots in the lengthwise direction of the information track;

means for detecting a tracking signal from the reflected light of the second light spot by the recording medium;

tracking control means for moving the first and second light spots in the tracking direction orthogonal to the lengthwise direction of the information track in conformity with the tracking signal; and means for providing to the tracking signal an offset corresponding to the positional deviation between the center of the first light spot and the center of the second light spot in the tracking direction, during the recording of the information.

Also, a method of effecting the recording and reproduction of information by the use of the above-described apparatus comprises the steps of:

scanning an information track with first and second light spots and recording information by the first light spot;

detecting a tracking signal from the reflected light of the second light spot;

providing an offset to the detected tracking signal;

effecting the tracking control of the first and second light spots with the tracking signal to which the offset has been provided;

scanning the information track on which the information has been recorded by the second light spot, thereby reproducing the information;

detecting a tracking signal from the reflected light of the second light spot; and effecting the tracking control of the second light spot with a tracking signal to which the offset is not provided.

An apparatus for effecting the recording and reproduction of information on an information track on a recording medium which is an embodiment of the present invention comprises:

a first light source which emits a first light beam during recording and does not emit the light beam during reproduction;

a second light source which emits a second light beam during recording and during reproduction;

a beam splitter for combining the first and second light beams together;

an optical system for condensing the first and second light beams and applying the first and second light beams as first and second light spots, respectively, to the information track, whereinduring recording, a tracking signal is detected from the second light spot and at the same time, the information is recorded with the first light spot and during reproduction, a tracking signal is detected from the second light spot and at the same time, the information is reproduced by the second light spot;

means for moving the recording medium relative to the first and second light spots in the lengthwise direction of the information track;

an optical sensor for receiving the light of the second light spot reflected by the recording medium;

a tracking control circuit for detecting the tracking signal from the output of the optical sensor;

an actuator for driving at least a part of the optical system in conformity with the tracking signal to thereby move the first and second light spots in the tracking direction orthogonal to the lengthwise direction of the information track; and means for providing to the tracking signal an offset corresponding to the positional deviation between the center of the first light spot and the center of the second light spot in the tracking direction, during recording, the means not providing the offset to the tracking signal during reproduction.

An apparatus for effecting the recording and reproduction of information on a recording medium alternately provided with a plurality of information tracks and a plurality of tracking tracks which is another embodiment of the present invention comprises:

a first light source emitting a light beam for recording;

a second light source emitting a light beam for reproduction and first and second light beams for tracking;

a beam splitter for combining the light beam for recording, the light beam for reproduction and the first and second light beams for tracking together;

an objective lens for condensing the light beam for recording, the light beam for reproduction and the first and second light beams for tracking combined together and applying these light beams as a recording spot, a reproducing spot and first and second tracking spots, respectively, to the information tracks, the recording spot and the reproducing spot being applied to one of the plurality of information tracks, the first tracking spot being applied to the tracking track disposed on one side of one of the information tracks, the second tracking spot being applied to the tracking track disposed on the other the of said one of the information tracks;

means for moving the recording medium relative to the recording spot, the reproducing spot and the first and second tracking spots in the lengthwise direction of the information tracks;

first and second optical sensors for receiving the reflected light of the first and second tracking spots, respectively, by the recording medium;

a tracking control circuit for differentiating the outputs of the first and second optical sensors to thereby detect a tracking signal;

an actuator for moving the objective lens in the tracking direction orthogonal to the lengthwise direction of the information track in conformity with the tracking signal;

a third optical sensor for receiving the light of the reproducing spot reflected by the recording medium;

a reproduction circuit for reproducing the information from the output of the third optical sensor; and means for providing to the tracking signal an offset corresponding to the positional deviation between the center of the recording spot and the center of the reproducing spot in the tracking direction, during recording.

BRIEF DESCRIPTION OF THE DRAWING

FIG. 11 is a flow chart for illustrating a second embodiment of the offset detecting method in the present invention.

FIG. 13 is a flow chart for illustrating a third embodiment of the offset detecting method which uses the circuit of FIG. 12.

DETAILED DESCRIPTION OF THE PREFERRED EMBODIMENTS

Figure 3:
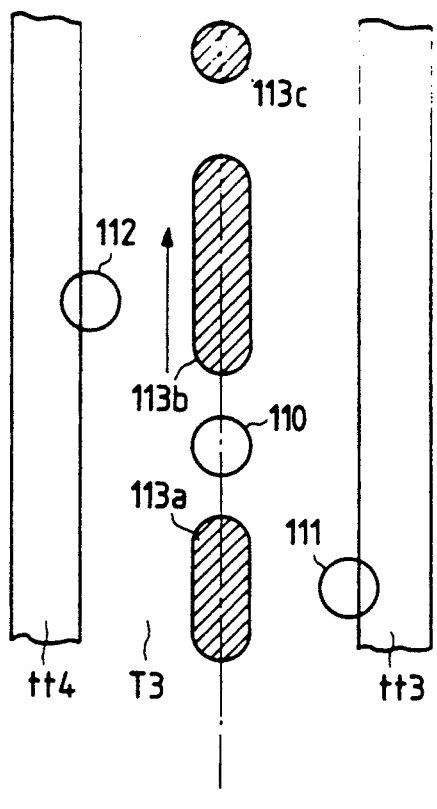
FIG. 3 is a schematic plan view showing the positional relations between tracks on the medium and light spots in the apparatus of FIG. 1.
Figure 5:
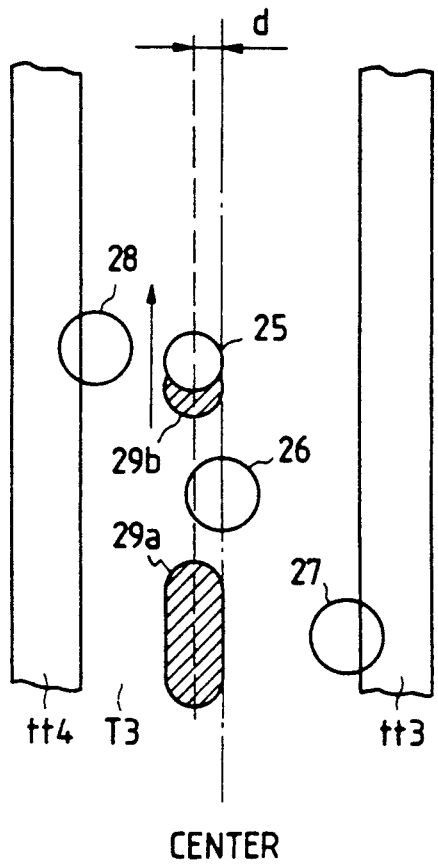
FIG. 5 is a schematic plan view showing the positional relations between a track on a medium and light spots in an information recording and reproducing apparatus of the two-light-source type which is the base of the present invention.

The operation on an optical card in the two-light-source system which is the base of the present invention will first be described with reference to FIG. 5. In this example, the conventional three light spots are not used for the recording of information, but a light spot 25 for recording is provided discretely. A light spot 26 for AF and light spots 27 and 28 for AT are similar to the diffracted light 110, 111 and 112, respectively, of FIG. 3. However, the light spots 26, 27 and 28 are of the same size, while the light spot 25 is smaller than them. FIG. 5 shows a state in which information is being recorded on a track T3 in the direction of the arrow by the light spot 25.

The width of pits 29a and 29b indicated by hatching which are recorded by the light spot 25 is small as compared with the light spot 26 for reproduction. Accordingly, even if the scanning locus of the light spot 26 deviates more or less from the scanning locus of the light spot 25, the signal RF will not be as affected as in the case of FIG. 3. When in this manner, the ratio between the light spots 25 and 26 is made great, the tracking margin becomes great but the contrast of the signal RF also decreases and therefore, the light spot 26 cannot be made indiscretely large. Also, if the wavelength of the light forming the light spot 25 is made different from the wavelengths of the light forming the light spots 26, 27 and 28, the reflected light of the light spot 25 can be simply separated by a dichroic mirror and will not mix with a photodetector and thus, will not affect AF control and AT control.

However, even this two-light-source system suffers from a problem. This system is implemented by making lights rays from two light sources join one and the same optical system, but it is difficult to make two optical axes accurately coincident with each other. That is, in FIG. 5, it may be said to be virtually impossible to accurately position the light spots 25 and 26 on a dot-and-dash line (the center of the track) parallel to tracking tracks tt3 and tt4. Therefore, in the actual apparatus, as shown in FIG. 5, the light spots 25 and 26 lie with an amount of deviation d therebetween in a direction perpendicular to the tracks. That is, as is apparent from FIG. 5, the light spot 26 scans the dot-and-dash line with an amount of deviation d from the pits 29a and 29b recorded on a broken line with the light spot 25. This decreases the tracking margin which has been increased with much effort by making the light spot 26 larger than the light spot 25. Also, the amount of deviation d between the light spots 25 and 26 differs from apparatus to apparatus and therefore, if recording and reproduction are effected by discrete apparatuses, there is the possibility that information cannot be reproduced at all. The present invention solves this problem by providing an offset to a tracking signal.

Figure 6:
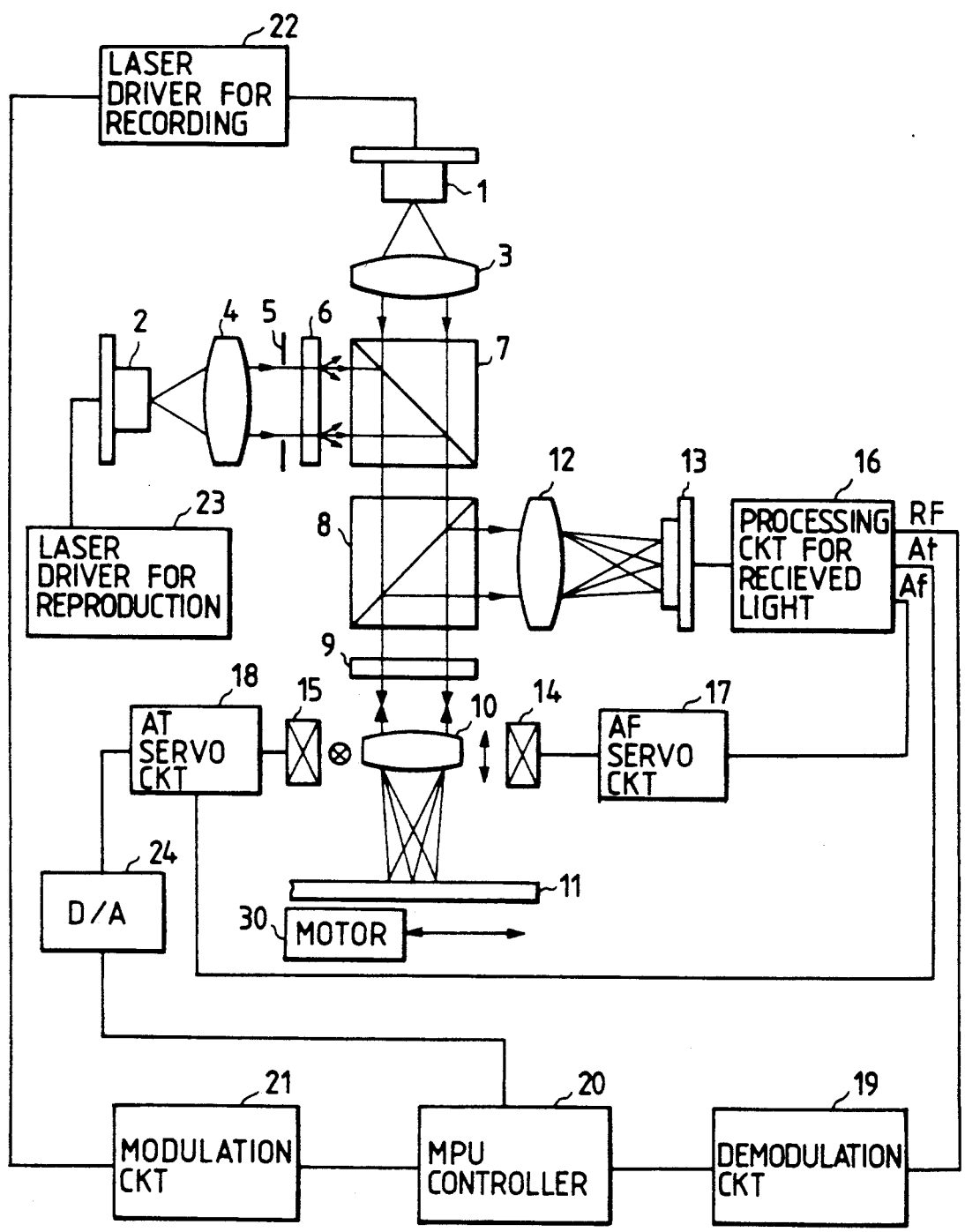
FIG. 6 is a schematic diagram showing an embodiment of the information recording and reproducing apparatus of the present invention.

FIG. 6 is a schematic diagram showing an embodiment of the optical information recording and reproducing apparatus of the present invention using an optical card as a recording medium. In this embodiment, the astigmatism method is used for AF and the three-beam method is used for AT.

In FIG. 6, the reference numeral 1 designates a semiconductor laser for recording. A divergent light beam from the semiconductor laser 1 is made into a parallel light beam by a collimator lens 3, and the parallel light beam passes through a dichroic prism 7, a polarizing beam splitter 8 and a quarter wavelength plate 9 to an objective lens 10. The light beam is applied as a minute spot to an optical card 11 by the objective lens 10, and forms a recording pit based on information on the recording surface of the optical card 11. The optical card 11 is reciprocally moved in the lengthwise direction of tracks indicated by the arrow, by a motor 30. The optical card 11 is the same as the optical card 107 shown in FIG. 1.

The reflected light from the optical card 11 passes through the objective lens 10 and the quarter wavelength plate 9 and is reflected toward a photodetector 13 (which is the same as the photodetector 109 in FIG. 1) by the polarizing beam splitter 8. In this case, that reflected light is reflected and absorbed by a toric lens 12 provided with film for cutting a wavelength 830 nm and therefore, does not arrive at the photodetector 13 and does not adversely affect an information reproducing system and an AT/AF control system.

Next, a divergent light beam from a semiconductor laser 2 for reproduction of a wavelength 780 nm is made into a parallel light beam by a collimator lens 4, and the light beam is limited by an aperture 5 and is divided into a plurality of light beams by a diffraction grating 6. The plurality of light beams are reflected by the dichroic prism 7, and follow substantially the same optical path as the optical path of the semiconductor laser 1 and are applied as minute spots to the optical card 11. The reflected light beams from the optical card 11 passes through the objective lens 10 and the quarter wavelength plate 9 and are reflected by the polarizing beam splitter 8, and are condensed on the photodetector 13 by the toric lens 12.

Since the light beam from the semiconductor laser 2 is limited by the aperture 5, it becomes a group of light spots larger than the light spot of the semiconductor laser 1, on the optical card 11. The semiconductor laser 2 is used for focusing control and tracking control and is therefore driven by a laser driver 23 for reproduction so as to be always a predetermined weak quantity of light both during recording and during reproduction. Also, the semiconductor laser 1 is driven only during recording by a laser driver 22 for recording in accordance with a recording sign into which information produced by a controller 20 including a microprocessing unit (MPU) is modulated by a modulation circuit 21.

It is often the case with the actual apparatus that recording information is provided from an outside apparatus, and in that case, the controller 20 includes an interface with the outside apparatus, and recording information is provided through this interface. Reproduction information which will be described later is also transferred to the outside apparatus through this interface.

Figure 1:
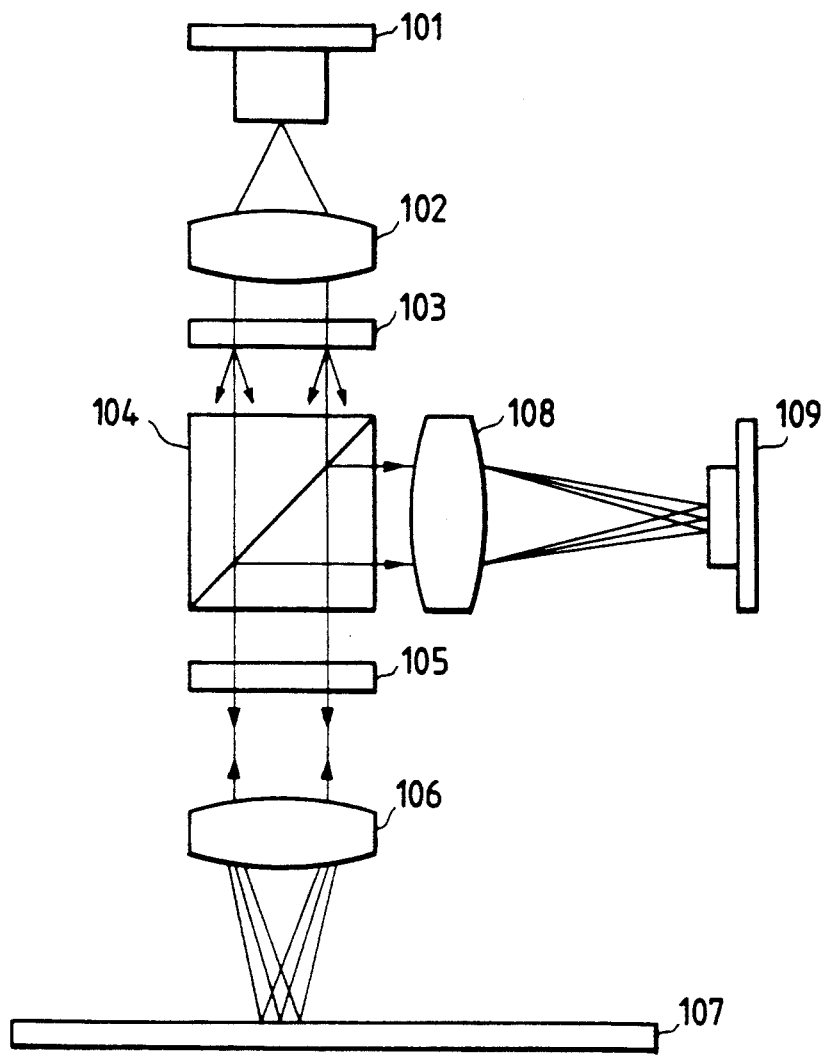
FIG. 1 is a schematic view showing an example of an information recording and reproducing apparatus of the single-light-source type according to the prior art.
Figure 4:
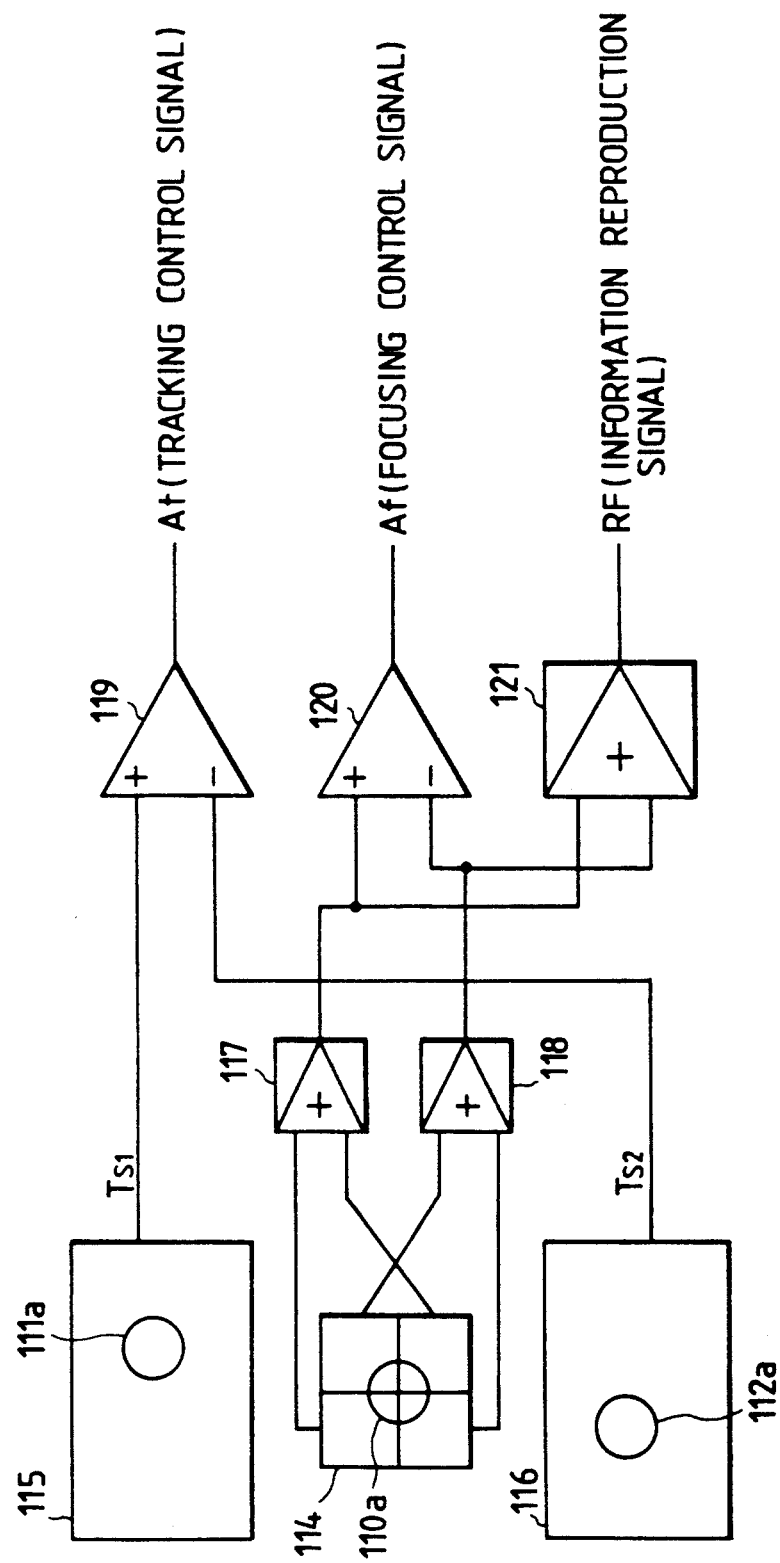
FIG. 4 diagrammatically shows a detection circuit for a reproduction signal and a control signal in the apparatus of FIG. 1.

On the other hand, the photodetector 13 is of a construction similar to that of the photodetector 109 of FIG. 1, and more particularly, it is constructed as described with respect to the photodetectors 114–116 of FIG. 4. A processing circuit 16 for received light is of the same construction as the addition circuits 117, 118, 121 and the differential circuits 119, 120 shown in FIG. 4, and produces an information reproduction signal RF, a focusing control signal Af and a tracking control signal At on the basis of a signal received by the photodetector 13. The focusing control signal Af drives a focusing coil 14 through an AF servo circuit 17 to thereby move the objective lens 10 vertically, i.e., in a direction parallel to the optical axis, and focuses the light spot on the optical card 11. The tracking control signal At likewise drives a tracking coil 15 through an AT servo circuit 18 to thereby move the objective lens in a direction perpendicular to the plane of the drawing sheet, i.e., the tracking direction perpendicular to the lengthwise direction of information tracks, and effect tracking control. Also, the optical card 11, as previously described, is moved relative to the light spots in the direction of arrow by the motor 30, and the light spots scan the optical card 11.

The other input of the AF servo circuit 18 is an offset input to which is input an analog signal into which the signal of the controller 20 has been converted by a D/A converter 24, so that the offset of tracking can be freely changed by the controller 20. The information reproduction signal RF is demodulated from the recording sign into the original information by a demodulation circuit 19 and is read by the controller 20. Also, this is generally transferred to the outside apparatus through the interface in the controller 20, as previously described.

The light beams from the semiconductor lasers 1 and 2 join the same optical path by the dichroic prism 7 and it is difficult to adjust the optical axes accurately on the optical card 11. The ordinary track pitch, i.e., the pitch of each of the tracking tracks tt1, tt2, tt3 and tt4 of FIG. 5, is about 12 $\mu$m, and it is necessary that the light spot for recording and the light spot for reproduction agree with each other in the order of of submicron. It is almost impossible, rather than difficult, to optically adjust each optical information recording and reproducing apparatus in such an order.

Figure 7A:
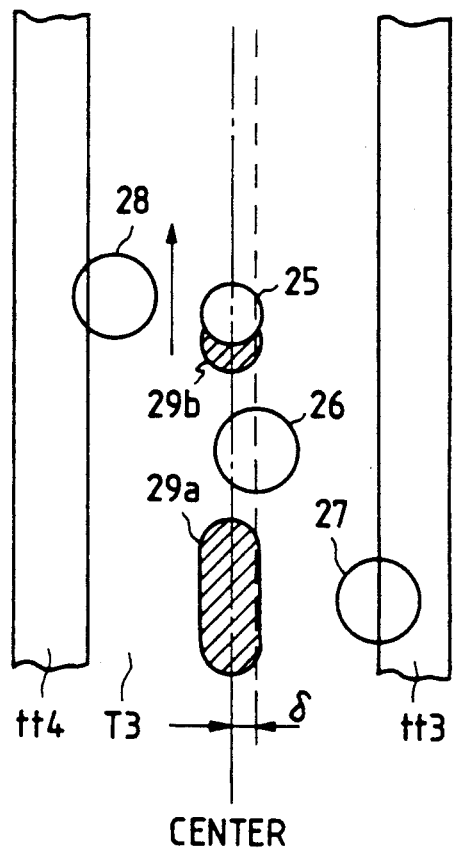
FIGS. 7A and 7B are schematic plan views showing the positional relations between tracks on a medium and light spots during recording and during reproduction in the apparatus of FIG. 6.
Figure 7B:
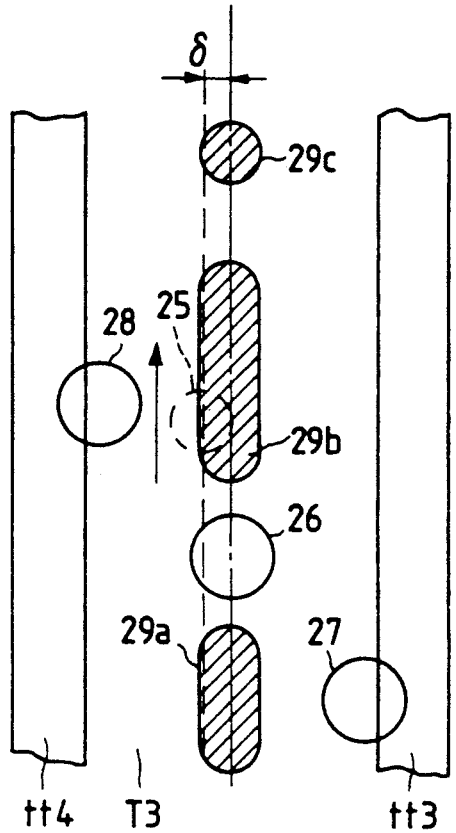

So, in order to solve this, in the present invention, the offset input signal of the AT servo circuit 18 is changed during recording and during reproduction to change the tracking position, thereby accomplishing a tracking correction. FIGS. 7A and 7B illustrate the above-described operation, and in these figures, the reference characters of various portions are the same as those in FIG. 5. FIG. 7A represents the state during recording, and in this case, an offset is provided to the AT servo circuit 18 to thereby deviate the tracking position, indicated by a broken line, by $\delta$ rightwardly as viewed in the figure. Accordingly, the positions of the light spots 26, 27 and 28 shift by $\delta$ to the right from the center. $\delta$ is the difference between the positions of light spots 25 and 26 provided by position detecting means which will be described later, and as a result, the light spot 25 for recording scans the center of a track T3 indicated by a dot-and-dash line and recording pits 29a and 29b are formed at the center of the track T3.

FIG. 7B represents a state in which the thus recorded information is reproduced. In this case, the offset of the AT servo circuit 18 is rendered into zero and the light spot 26 scans the center of the track T3, and the light spots 27 and 28 overlap with the tracking tracks tt3 and tt4, respectively at the same rate. At this time, the location of the light spot 25 for recording indicated by a broken line deviates by $\delta$ to the left, but this will pose no problem because the light spot 25 is not turned on. In this manner, the scanning locus of the light spot 25 during recording, i.e., the recording pit, and the scanning locus of the light spot 26 during reproduction becomes coincident with each other substantially at the center of the track T3, and can fully enjoy the feature of the two-light-source system that the tracking margin is great.

Figure 2:
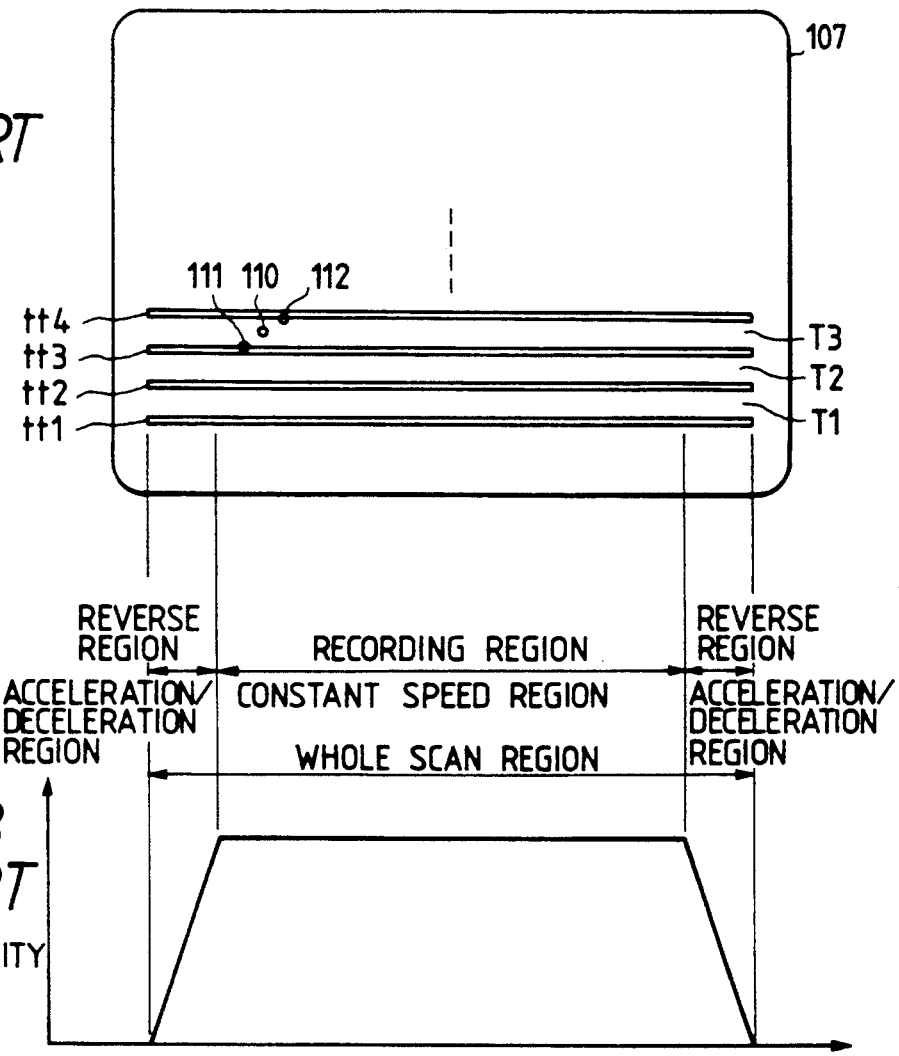
FIGS. 2A and 2B are a schematic plan view showing an example of a recording medium used in the apparatus of FIG. 1 and a graph showing the relation between the position on the recording medium and the relative velocity of the light spot, respectively.
Figure 8A:
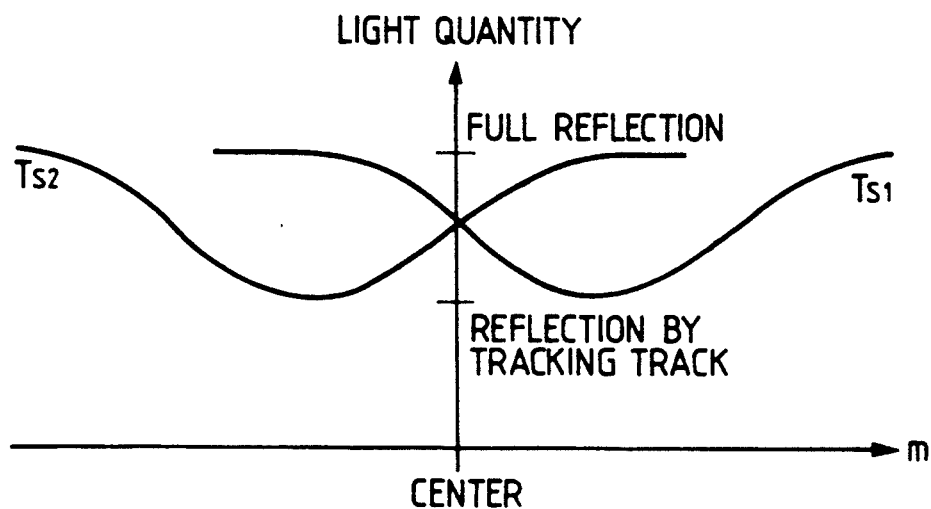
FIGS. 8A and 8B show the relation between the positions of light spots and the quantity of light received by each optical sensor, and a tracking signal, respectively.
Figure 8B:
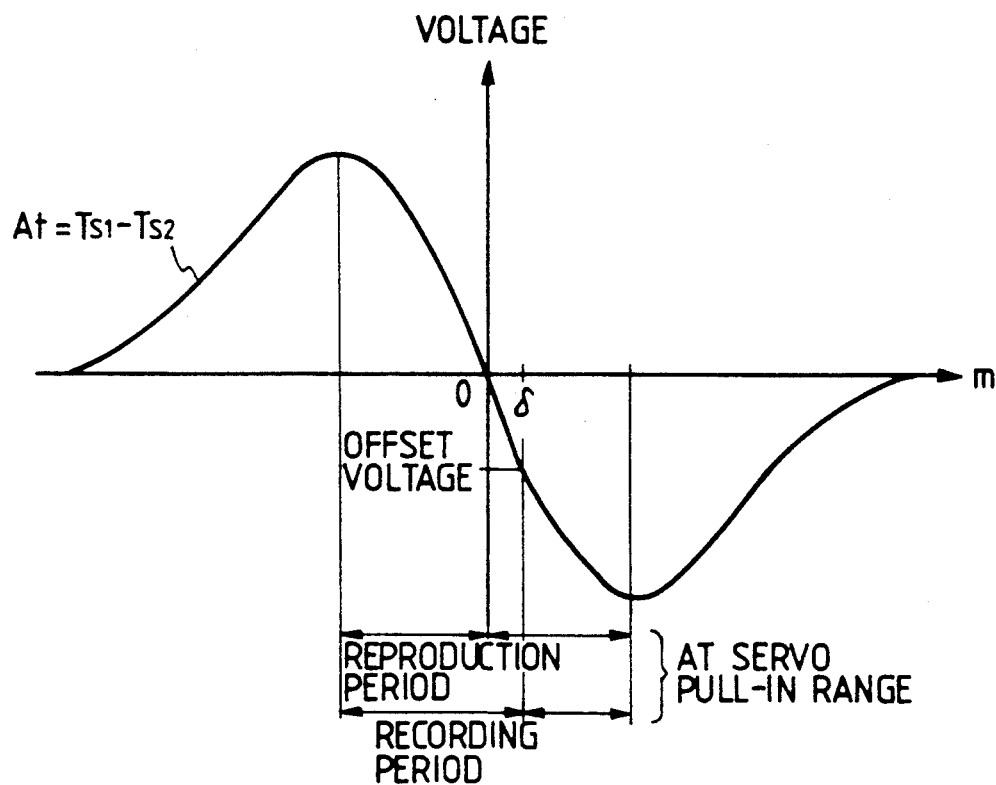

The above description will be further made with respect to signals shown in FIGS. 8A and 8B. FIG. 8A shows the signals $TS_1$ and $TS_2$ of FIG. 4, and the horizontal axis m of this figure represents the distance when light spots 111 and 112 or 27 and 28 have moved in a direction perpendicular to the tracks. The vertical axis of this figure represents the quantities of light on optical sensors 115 and 116, and in this case, it represents an example in which the more the light spots overlap with the tracking tracks tt3 and tt4, the more the quantity of received light decreases. When as shown, offset is absent in the optical system and the electrical system, the position m at which $TS_1$ and $TS_2$ intersect each other is the central position of the track T3, and this is a state in which the light spots 27 and 28 overlap with the tracking tracks tt3 and tt4, respectively, at the same rate. FIG. 8B represents a tracking signal At shown in $At = TS_1 - TS_2$. As can be seen from this figure, when the offset is zero and tracking control is effected at the center of the track T3, the AT servo pull-in range is bisymmetrical and the servo characteristic is most stable for a disturbance such as a vibration. However, if as described in connection with FIG. 7A, an offset voltage is applied during recording to deviate the tracking position by 6 in the direction m, the AT servo pull-in range will become non-bisymmetrical and in this example, the right side thereof will become small and become weak to disturbance. Accordingly, it is better for the period during which an offset is forcibly applied to the AT servo to be as short as possible. Particularly, vibration is great in the acceleration/deceleration region described in connection with FIG. 2B and therefore, it is better here for the offset to be zero. It is only to the recording region that the offset need be actually applied and therefore, it is practical to apply the offset immediately before the light spot overlaps the recording region, and render the offset to zero immediately after the recording region terminates. This detection of the recording region, although not shown, can be simply realized by providing a position detecting encoder in a mechanism for scanning and moving the optical card 11. Also, the above embodiment has been shown with respect to a case where optical and electrical offsets are absent, but where these offsets are present, these offsets can be applied both during recording and during reproduction.

Figure 9:
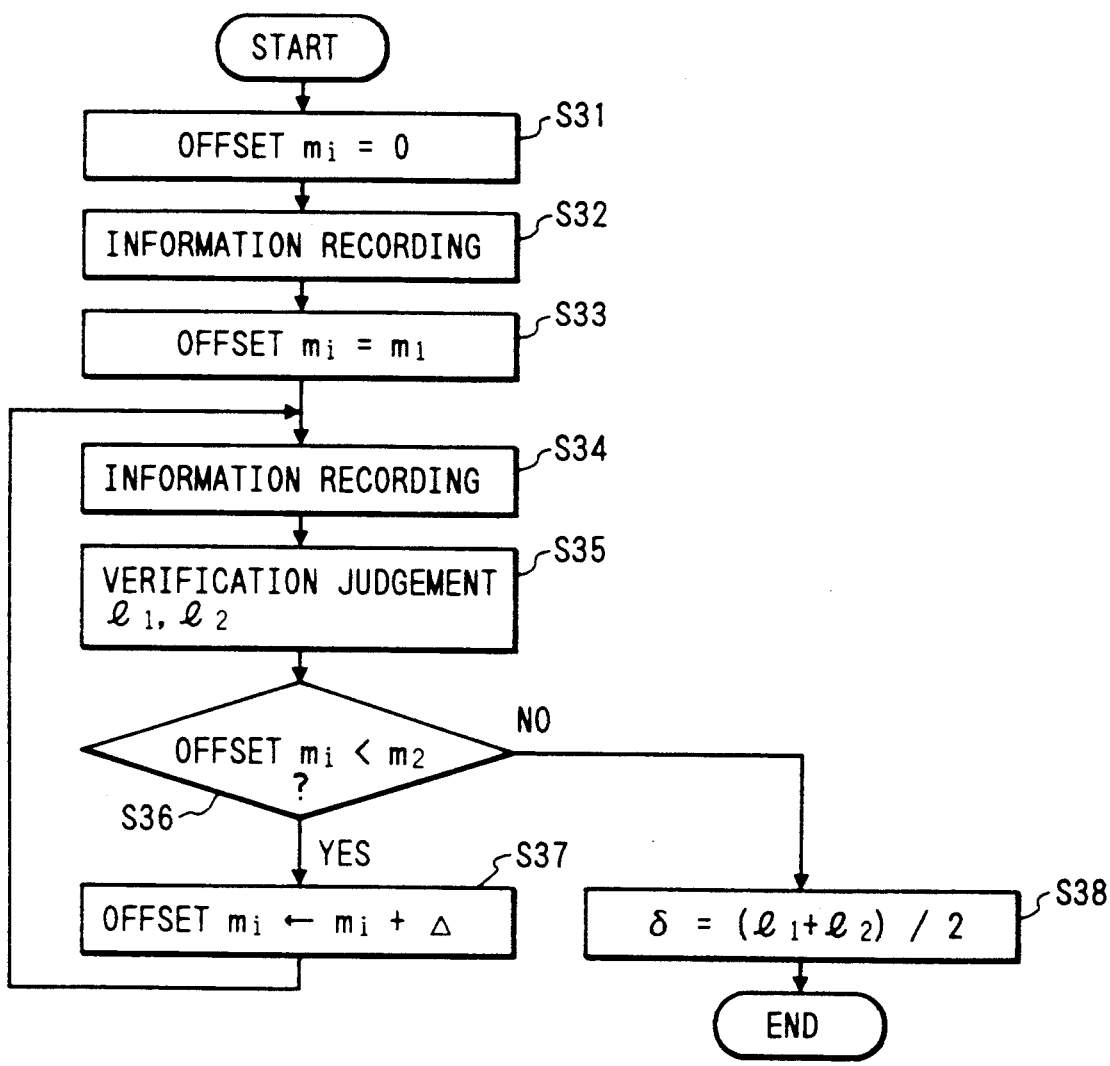
FIG. 9 is a flow chart for illustrating a first embodiment of an offset detecting method in the present invention.

A description will now be provided of the operation of detecting the distance in the tracking direction between the light spots 25 and 26 shown in FIG. 7A, i.e., the deviation amount $\delta$. FIG. 9 is a flow chart of the operation of detecting $\delta$, and this flow is executed in the embodiment of FIG. 6.

Figure 10:
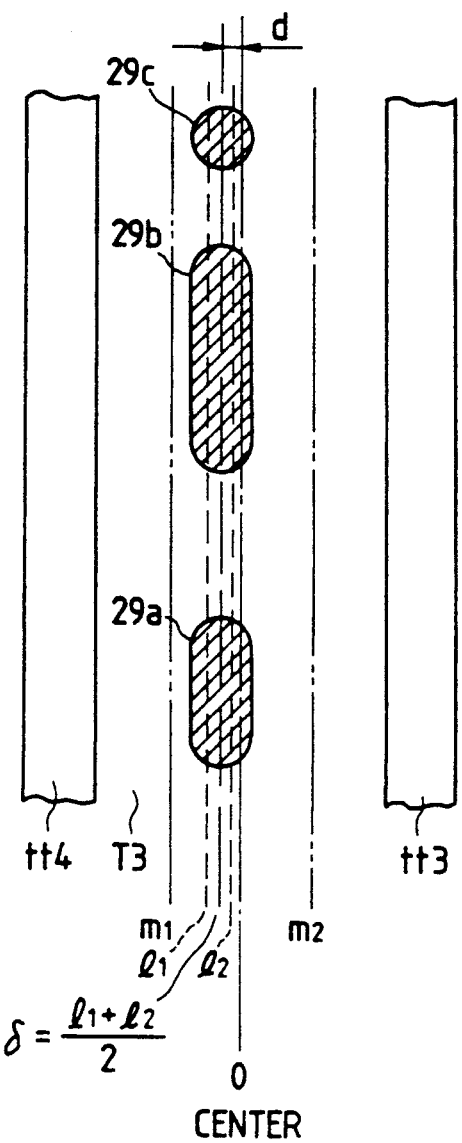
FIG. 10 is a schematic plan view showing the positional relation between a track and the scanning loci of light spots in the method of FIG. 9.

First, at S (step) 31, the offset mi is rendered to zero by the controller 20, the D/A converter 24 and the AT servo circuit 18, and at S32, predetermined information is test-recorded on the track T3 on the optical card 11 by the controller 20, the modulation circuit 21 and the laser driver 22 for recording. The positional relations between the recording pits and the track at this time are shown in FIG. 10. If as in the example shown in FIG. 5, the light spots 25 and 26 deviate by d from each other, the recording pits 29a, 29b and 29c are recorded at positions indicated by a broken line which deviate by d from the center of the track T3 indicated by the dot-and-dash line. Positions $m_1$ and $m_2$ indicated by the dot-and-dash line are positioned symmetrically with respect to the center of the track T3, and are spaced apart from the center by a distance sufficiently greater than d. Subsequently, at S33, the offset mi is rendered into $m_i$, and at S34, the recording pits are reproduced. The reproduction signal reaches the controller 20 through the processing circuit 16 for received light and the demodulation circuit 19, and is checked with predetermined information recorded by the verification judgement of S35. Subsequently, at S36, the current offset amount mi is compared with $m_2$, and if mi has not reached $m_2$, at S37, the offset value is moved by a minute amount $\Delta$ to right, and again at S34, the information is reproduced. As the gradual rightward movement of the offset is thus repeated at S34–S37, the offset value mi reaches $m_2$ and goes out of the loop. Of this loop, an offset value $l_1$ indicative of the fact that the result of the verification judgement operation of S35 has changed from no to OK and an offset value $l_2$ indicative of the fact that the result has changed from OK to no are stored, and at S38, the set offset value $\delta$ is calculated on the basis of an equation $\delta = (l_1 + l_2)/2$, thus terminating the flow. Then, as described in connection with FIGS. 7 to 8B, during recording, an offset is applied by this $\delta$ in the direction opposite to that during the detection of the position. In this foregoing description, the plus and minus signs of mi are omitted. $\delta$ thus measured may not rightly coincide with d. However, if the offset is corrected by the value $\delta$ measured by this method, it will suffice in practical use. Also, in the above-described embodiment, the information reproduction has been started at $m_1$ and terminated at $m_2$, but conversely, the information reproduction may be started at $m_2$ and terminated at $m_1$.

In the embodiment of FIG. 9, the frequency of the information reproduction, i.e., the repetition frequency of the loop of S34–S38, is fixed at $(m_2 - m_1)\Delta$, whereas if this method is resorted to, $l_1$ and $l_2$ can be detected quickly, but as long a time as in a case where they are detected slowly will be required. Another embodiment improved in this point is shown in FIG. 11. In FIG. 11, the same step numbers as those in FIG. 9 represent the same operations and therefore need not be described.

In this embodiment, when the verification determination of S35 has changed from no to OK, a good flag is used at S40. If the offset is started at $m_1$ and the result of the verification is no at S35, the determination of a good flag of S40 and the determination of OK of S41 are passed through and further, the good flag setting of S42 is bypassed and the offset value is shifted to the right and the program goes round the loop of S41 and S42. Also, when the offset value reaches $l_1$ and the verification becomes OK, the method advances from S41 to S42, where 1 is set in the good flag, whereafter return is made to S34 through S37.

Next, the good flag is 1 and therefore, verification of OK is effected at S43 through S35 and S40, and if the offset has not reached $l_2$, the program continues to go round the loop of S37–S34. When the offset exceeds $l_2$, the method proceeds from S43 to S38, where $\delta$ is calculated, and the flow terminates.

In this embodiment, the repetition frequency of the loop is $(l_2 - m_1)/\Delta$ and decreased as compared with that in the embodiment of FIG. 9 and therefore, the position detecting time can be shortened. Like this, there are various other procedures of changing the offset value in the position detection, and the present invention is not restricted to the above-described embodiments.

In the embodiments of FIGS. 9 and 11, there has been shown an example in which the positional relation is guessed as it were, indirectly, by checking predetermined recording information and the reproduction information thereof with each other.

Figure 12:
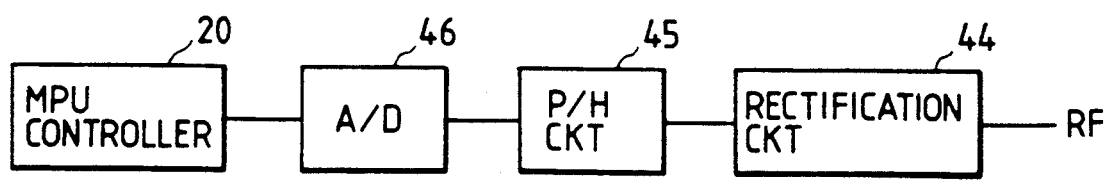
FIG. 12 is a block diagram showing a modification of the offset detecting circuit.

FIG. 12 is a block diagram showing a modification of the signal processing circuit for determining the reproduction signal itself and effecting position detection. The other portions than this circuit are constructed similarly to FIG. 6. This embodiment utilizes the fact that the amplitude of the reproduction signal RF becomes greatest when the recording pit and the reproducing light spot coincide with each other. In this embodiment, the information reproduction signal RF is rectified by a rectification circuit 44 provided in lieu of the demodulation circuit 19 in FIG. 6, and the maximum value in one cycle of information reproduction is held by a peak hold circuit 45, and is converted into a digital value by an A/D converter 46 and compared by the controller 20. FIG. 13 shows the procedure of this operation. In FIG. 13, the same step numbers as those in FIGS. 9 and 11 represent the same operations and therefore need not be described. As in FIGS. 9 and 11, the offset value is started from $m_1$, and at S34, information reproduction is effected. Then, at S47, the detection of the peak of the amplitude of the information reproduction signal RF described in connection with FIG. 12 is effected. Subsequently, at S48, the last peak value $P_{i-1}$ and the current peak value $P_i$ are compared with each other, and if $P_i$ is greater, at S37, the offset value is shifted by $\Delta$ to the right, and the program executes the steps of the loop of S37–S34. Of course, the initial value of $P_{i-1}$ is set to zero so as to ensure execution of the steps in the loop. When at S48, $P_i$ becomes $P_i \leq P_{i-1}$, the program executes steps outside the loop, and at S49, the then offset value is rendered to mi, thus terminating the flow.

The embodiments of FIGS. 9 and 11 can be carried out by the construction of FIG. 6 in which software is contained in the controller 20. However, if the extent of this software is large, it is better that the software be not contained in the recording and reproducing apparatus. In such case, an adjusting device containing the software therein can be connected to the recording and reproducing apparatus only during adjustment. Also, the circuit of FIG. 12 is unnecessary for the ordinary recording and reproducing operations and therefore, it is a loss in cost and size that this circuit is contained in the recording and reproducing apparatus. The optical positional relation, if once made, will not fluctuate later and therefore, in this embodiment, it is practical to couple the circuit of FIG. 12 to the optical information recording and reproducing apparatus during adjustment and effect position detection, and cause only the result $\delta$ to be stored in the optical information recording and reproducing apparatus or be set by other means.

The present invention is not restricted to the above-described embodiments, but permits other various applications. For example, in the embodiments, the light spots for reproduction and control are three spots, but the present invention is not restricted thereto. Various systems have heretofore been proposed for focusing control and tracking control, and it is also possible to realize information reproduction, focusing control and tracking control by a single light spot. The system for effecting reproduction and control by a single light spot like this is entirely similar to the above-described embodiments with respect of tracking, and the present invention is also effective when it is applied to such a system.

The present invention is applicable not only to an apparatus using an optical card, but also to apparatuses using any form of recording media such as a disk-like medium or a tape-like medium. The present invention covers all of such applications without departing from the scope of the invention as defined in the appended claims.

What is claimed is:

1. An apparatus for effecting the recording of information on and reproduction of information from an information track on a recording medium, comprising:
   means for applying a first light spot to the information track and for recording the information with the first light spot;
   means for applying a second light spot comprising at least one light spot to the information track and for reproducing the information with the second light spot;
   means for moving the recording medium relative to the first and second light spots in the lengthwise direction of the information track;
   means for detecting a tracking signal from reflected light from the recording medium, caused by the application of the second light spot to the recording medium;
   tracking control means for moving the first and second light spots in a tracking direction orthogonal to the lengthwise direction of the information track in conformity with the tracking signal; and
   means for imparting an offset to the tracking signal, wherein upon recording information, the first and second light spots are applied to the information track and an offset corresponding to a positional deviation between the center of the first light spot and the center of the second light spot in the tracking direction is imparted to the tracking signal by said offset imparting means, and upon reproducing information, the second light spot is applied to the information track while the first light spot is not applied to the information track and any offset is not imparted to the tracking signal.

2. An apparatus according to claim 1, wherein a plurality of information tracks and a plurality of tracking tracks are alternately disposed on the recording medium, and wherein the second light spot comprises a spot for reproduction applied to one of the plurality of information tracks, a spot for tracking applied to the tracking track disposed on one side of one of the information tracks, and a spot for tracking applied to the tracking track disposed on the other side of said one of the information tracks.

3. An apparatus according to claim 2, wherein said tracking signal detecting means comprises a first optical sensor for receiving the reflected light of the spot for tracking disposed on one side of one of the information tracks, a second optical sensor for receiving the reflected light of the spot for tracking applied to the tracking track disposed on the other side of said one of the information tracks, and a differential circuit for differentiating the outputs of said first and second optical sensors.

4. An apparatus according to claim 2, wherein said spot for reproduction is larger than said spot for tracking disposed on one side of one of the information tracks.

5. An apparatus according to claim 1, further comprising means for detecting the amount of the offset.

6. An apparatus according to claim 5, wherein said means for detecting the amount of the offset detects a plurality of reproduction signals by scanning a plurality of times with the second light spot the information track on which a particular signal is recorded by the first light spot while varying the amount of the offset, and detects the amount of the offset before being varied by comparing the reproduction signals with the particular signal.

7. An apparatus according to claim 5, wherein said means for detecting the amount of the offset detects a plurality of reproduction signals by scanning the information track on which the information is recorded by the first light spot a plurality of times with the second light spot with varying the amount of the offset, and detects the amount of the offset when one of the reproduction signals which is greatest in signal amplitude is detected.

8. An apparatus for effecting the recording of information on and reproduction of information from an information track on a recording medium, comprising:
- a first light source which emits a first light beam upon recording and which does not emit the first light beam upon reproduction;
- a second light source which emits a second light beam upon both recording and during reproduction;
- a beam splitter for combining the first and second light beams together;
- an optical system for condensing the first and second light beams to apply a first light spot and a second light spot comprising at least one light spot to the information track on the recording medium, wherein upon recording, the first and second light spots are applied to the information track to record the information with the first light spot simultaneously with detecting a tracking signal from the second light spot and upon reproduction, the information is reproduced with the second light spot simultaneously with detecting the tracking signal from the second light spot;
- means for moving the recording medium relative to the first and second light spots in the lengthwise direction of the information track;
- a photosensor for receiving reflected light from the recording medium, caused upon the application of the second light spot to the recording medium;
- a tracking control circuit for detecting a tracking signal from an output from the photosensor;
- an actuator for driving at least a part of said optical system in conformity with the tracking signal to thereby move the first and second light spots in a tracking direction orthogonal to the lengthwise direction of the information track; and
- means for imparting to the tracking signal an offset corresponding to a positional deviation between the center of the first light spot an the center of the second light spot in the tracking direction upon recording, wherein said offset imparting means does not impart any offset to the tracking signal upon reproduction.

9. An apparatus according to claim 8, wherein a plurality of information tracks and a plurality of tracking tracks are alternately disposed on the recording medium, and wherein the second light spot comprises a spot for reproduction applied to one of the plurality of information tracks, a spot for tracking applied to the tracking track disposed on one side of one of the information tracks, and a spot for tracking applied to the tracking track disposed on the other side of said one of the information tracks.

10. An apparatus according to claim 9, wherein said optical sensor comprises a first optical sensor for receiving the reflected light of the spot for tracking disposed on one side of one of the information tracks, and a second optical sensor for receiving the reflected light of the spot for tracking applied to the tracking track disposed on the other side of the one of the information tracks, and wherein said tracking control circuit comprises a differential circuit for differentiating the outputs of said first and second optical sensors.

11. An apparatus according to claim 10, wherein said optical sensor further comprises a third optical sensor for receiving the reflected light of the spot for reproduction.

12. An apparatus according to claim 9, wherein the spot for reproduction is larger than the spot for tracking disposed on one side of one of the information tracks.

13. An apparatus according to claim 8, further comprising means for detecting the amount of the offset, wherein said means for detecting the amount of the offset detects a plurality of reproduction signals by scanning a plurality of times with the second light spot the information track on which a particular signal is recorded by the first light spot while varying the amount of the offset, and detects the amount of the offset before being varied by comparing the reproduction signals with the particular signal.

14. An apparatus according to claim 8, further comprising means for detecting the amount of the offset, wherein said means for detecting the amount of the offset detects a plurality of reproduction signals by scanning the information track on which the information is recorded by the first light spot a plurality of times with the second light spot while varying the amount of the offset, and detects the amount of the offset when one of the reproduction signals which is greatest in signal amplitude is detected.

15. An apparatus according to claim 8, wherein said optical system includes an objective lens for condensing the first and second light beams on the medium, and wherein said actuator moves said objective lens in the tracking direction in conformity with the tracking signal.

16. An apparatus for effecting the recording and reproduction of information on a recording medium alternately provided with a plurality of information tracks and a plurality of tracking tracks, comprising:

a first light source emitting a light beam for recording;

a second light source emitting a light beam for reproduction and first and second light beams for tracking;

a beam splitter for combining the light beam for recording, the light beam for reproduction and the first and second light beams for tracking together;

an objective lens for condensing the light beam for recording, the light beam for reproduction and the first and second light beams for tracking combined together and applying these light beams as a recording spot, a reproducing spot and first and second tracking spots, respectively, to the information tracks, the recording spot and the reproducing spot being applied to one of said plurality of information tracks, the first tracking spot being applied to the tracking track disposed on one side of one of the information tracks, the second tracking spot being applied to the tracking track disposed on the other side of said one of the information tracks;

means for moving the recording medium relative to the recording spot, the reproducing spot and the first and second tracking spots in the lengthwise direction of the information tracks;

first and second optical sensors for receiving the reflected lights of the first and second tracking spots, respective, reflected by the recording medium;

a tracking control circuit for differentiating the outputs of the first and second optical sensors to thereby detect a tracking signal;

an actuator for moving the objective lens in the tracking direction orthogonal to the lengthwise direction of the information tracks in conformity with the tracking signal;

a third optical sensor for receiving the reflected light of the reproducing spot reflected by the recording medium;

a reproduction circuit for reproducing the information from the output of the third optical sensor; and means for providing to the tracking signal an offset corresponding to the positional deviation between the center of the recording spot and the center of a reproducing spot in the tracking direction, during recording.

17. An apparatus according to claim 16, wherein said reproducing spot is larger than said recording spot.

18. An apparatus according to claim 16, wherein during recording, the recording spot, the reproducing spot and the first and second tracking spots are applied to the recording medium and the tracking signal is detected from the reflected lights of the first and second tracking spots and at the same time, the information is recorded by the recording spot, and during reproduction, the recording spot is not applied to the medium and the reproducing spot and the first and second tracking spots are applied to the recording medium and the tracking signal is detected from the reflected lights of the first and second tracking spots and at the same time, the information is reproduced by the reproducing spot, and said means for providing an offset does not provide the offset to the tracking signal during reproduction.

19. An apparatus according to claim 16, further comprising means for detecting the amount of the offset.

20. An apparatus according to claim 19, wherein said means for detecting the amount of the offset detects a plurality of reproduction signals by scanning a plurality of times with the reproducing spot the information track on which a particular signal is recorded by the recording spot while varying the amount of the offset, and detects the amount of the offset before being varied by comparing the reproduction signals with the particular signal.

21. An apparatus according to claim 19, wherein said means for detecting the amount of the offset detects a plurality of reproduction signals by scanning a plurality of times with the reproducing spot the information track on which the information is recorded by the recording spot while varying the amount of the offset, and detects the amount of the offset before being varied when one of said reproduction signals which is greatest in signal amplitude is detected.

22. An apparatus according to claim 16, wherein said moving means reciprocally moves the medium relative to each of the spots, and said means for providing an offset provides the offset to the tracking signal when the relative velocity of the medium and the lights spots is constant during recording, and does not provide the offset to the tracking signal when the relative velocity of the medium and the light spots increases or decreases during recording.

23. A method of effecting recording of information and reproduction of information by use of an apparatus comprising means for applying a first light spot and a second light spot comprising at least one light spot to an information track on a recording medium, means for moving the recording medium relative to the first and second light spots in the lengthwise direction of the information track, means for detecting a tracking signal from a reflected light from the recording medium, caused upon the application of the second light spot to the recording medium, tracking control means for moving the first and second light spots in a tracking direction orthogonal to the lengthwise direction of the information track according to the tracking signal, and means for imparting to the tracking signal an offset corresponding to a positional deviation between the center of the first light spot and the center of the second light spot in the tracking direction, said method comprising the steps of:

upon recording, scanning the information track with the first and second light spots to record information with the first light spot;

upon recording, detecting the tracking signal from the reflected light caused upon the application of the second light spot;

upon recording, imparting an offset to the detected tracking signal;

upon recording, effecting a tracking control of the first and second light spots by the tracking signal to which the offset has been imparted;

upon reproduction, scanning the information track on which information has been recorded with the second light spot to reproduce the information;

upon reproduction, detecting a tracking signal from a reflected light caused upon the application of the second light spot; and upon reproduction, effecting a tracking control of the second light spot with the tracking signal to which any offset is not imparted.

24. A method according to claim 23, further comprising the step of detecting the amount of the offset.

25. A method according to claim 24, wherein the step of detecting the amount of the offset comprises:

the step of recording a particular signal on the information track by the first light spot;

the step of detecting a plurality of reproduction signals by scanning a plurality of times with the second light spot the information track on which the particular signal is recorded while varying the amount of the offset; and the step of detecting the amount of the offset before being varied by comparing the detected plurality of reproduction signals with the particular signal.

26. A method according to claim 24, wherein the step of detecting the amount of the offset comprises:

the step of recording the information on the information track by the first light spot;

the step of detecting a plurality of reproduction signals by scanning a plurality of times with the second light spot the information track on which the information is recorded while varying the amount of the offset; and the step of detecting the amount of the offset before being varied when one of the detected plurality of reproduction signals which is greatest in signal amplitude is detected.

27. An apparatus for effecting recording of information on and reproduction of information from an information track on a recording medium, comprising:

means for applying a first light spot to the information track to record information;

means for applying a second light spot comprising at least one light spot to the information track to reproduce information;

means for moving the recording medium relative to the first and second light spots in the lengthwise direction of the information track;

means for detecting a tracking signal from reflected light reflected form the recording medium, caused upon the application of the second light spot to the recording medium;

tracking control means for moving the first and second light spots in a tracking direction orthogonal to the lengthwise direction of the information tack according to the tracking signal; and means for imparting to the tracking signal an offset corresponding to a positional deviation between the center of the first light spot and the center of the second light spot in the tracking direction, wherein said offset imparting means imparts the offset to the tracking signal when the relative velocity between the recording medium and the light spot is constant, and said offset imparting means does not impart any offset to the tracking signal when the relative velocity between the recording medium and the light spot is being increased or decreased.

28. An apparatus according to claim 27, wherein a plurality of information tracks and a plurality of tracking tracks are alternately provided on the recording medium, and wherein the second light spot comprises a reproduction light spot to be applied to one of the plurality of information tracks, a first tracking spot to be applied to a tracking track disposed at one side with respect to the information track, and a second tracking spot to be applied to a tracking track disposed at the other side with respect to the information track.

29. An apparatus according to claim 28, wherein said tracking signal detection means comprises a first photosensor for receiving reflected light caused upon the application of the first tracking spot to the recording medium, a second photosensor for receiving reflected light caused upon the application of the second tracking spot to the recording medium, and a differential circuit for obtaining a difference between outputs from said first and second photosensors.

30. An apparatus according to claim 28, wherein the size of the reproduction spot is larger than that of the first light spot.

31. An apparatus according to claim 27, further comprising means for detecting an amount of the offset.

32. An apparatus according to claim 31, wherein said offset amount detecting means detects the amount of the offset such that the information track on which a given signal has been recorded by the first light spot is scanned a plurality of times by the second light spot while varying the amount of the offset to detect a plurality of reproduction signals so as to compare the reproduction signals wit the given signal.

33. An apparatus according to claim 31, wherein said offset amount detecting means detects the amount of the offset such that the information track on which information has been recorded by the first light spot is scanned a plurality of times by the second light spot while varying the amount of the offset to detect a plurality of reproduction signals so as to detect the amount of the offset when detecting a reproduction signal having a largest signal amplitude among the plurality of reproduction signals.

34. An apparatus for effecting the recording of information on and the reproduction of information from an information track on a recording medium, comprising:

means for applying a first light spot to the information track and for recording the information with the first light spot;

means for applying a second light spot comprising at least one light spot to the information track and for reproducing the information with the second light spot;

means for moving the recording medium relative to the first and second light spots in the lengthwise direction of the information track;

means for detecting a tracking signal from reflected light from the recording medium, caused by the application of the second light spot to the recording medium;

tracking control means for moving the first and second light spots in a tracking direction orthogonal to the lengthwise direction of the information track in conformity with the tracking signal; and means for selectively imparting to the tracking signal an offset corresponding to a positional deviation between the center of the first light spot and the center of the second light spot in the tracking direction according to an operating state which is a recording state or a reproduction state.

35. An apparatus according to claim 34, wherein a plurality of information tracks and a plurality of tracking tracks are alternately disposed on the recording medium, and wherein the second light spot comprises a spot for reproduction applied to one of the plurality of information tracks, a spot for tracking applied to the tracking track disposed on one side of one of the information tracks, and a spot for tracking applied to the tracking track disposed on the other side of said one of the information tracks.

36. An apparatus according to claim 33, wherein said tracking signal detecting means comprises a first optical sensor for receiving the reflected light of the spot for tracking disposed on one side of one of the information tracks, a second optical sensor for receiving the reflected light of the spot for tracking applied to the tracking track disposed on the other side of said one of the information tracks, and a differential circuit for differentiating the outputs of said first and second optical sensors.

37. An apparatus according to claim 35, wherein said spot for reproduction is larger than said spot for tracking disposed on one side of one of the information tracks.

38. An apparatus according to claim 34, further comprising means for detecting the amount of the offset.

39. An apparatus according to claim 38, wherein said means for detecting the amount of the offset detects a plurality of reproduction signals by scanning a plurality of times with the second light spot the information track on which a particular signal is recorded by the first light spot while varying the amount of the offset, and detects the amount of the offset before being varied by comparing the reproduction signals with the particular signal.

40. An apparatus according to claim 38, wherein said mans for detecting the amount of the offset detects a plurality of reproduction signals by scanning a plurality of times with the second light spot the information track on which the information is recorded by the first light spot while varying the amount of the offset, and detects the amount of the offset when one of the reproduction signals which is greatest in signal amplitude is detected.

41. An apparatus for effecting the recording of information on and the reproduction of information from an information track on a recording medium, comprising:
    a first light source which emits a first light beam upon recording and which does not emit a light beam upon reproduction;
    a second light source which emits a second light beam upon both recording and reproduction;
    a beam splitter for combining the first and second light beams together;
    an optical system for condensing the first and second light beams to apply a first light spot and a second light spot comprising at least one light spot to the information track on the recording medium, wherein upon recording, the first and second light spots are applied to the information track to record the information with the first light spot simultaneously with detecting a tracking signal from the second light spot, and upon reproduction, the information is reproduced with the second light spot simultaneously with detecting the tracking signal from the second light spot;
    means for moving the recording medium relative to the first and second light spots in the lengthwise direction of the information track;
    a photosensor for receiving reflected light form the recording medium, caused upon the application of the second light spot to the recording medium;
    a tracking control circuit for detecting a tracking signal from an output from said photosensor;
    an actuator for driving at least a part of said optical system in conformity with the tracking signal to thereby move the first and second light spots in a tracking direction orthogonal to the lengthwise direction of the information track; and
    means for selectively imparting to the tracking signal an offset corresponding to a positional deviation between the center of the first light spot and the center of the second light spot in the tracking direction according to an operating state which is a recording state or a reproduction state.

42. An apparatus according to claim 41, wherein a plurality of information tracks and a plurality of tracking tracks are alternately disposed on the recording medium, and wherein the second light spot comprises a spot for reproduction applied to one of the plurality of information tracks, a spot for tracking applied to the tracking track disposed on one side of one of the information tracks, and a spot for tracking applied to the tracking track disposed on the other side of said one of the information tracks.

43. An apparatus according to claim 42, wherein said optical sensor comprises a first optical sensor for receiving the reflected light of the spot for tracking disposed on one side of one of the information tracks, and a second optical sensor for receiving the reflected light of the spot for tracking applied to the tracking track disposed on the other side of the one of the information tracks, and wherein said tracking control circuit comprises a differential circuit for differentiating the outputs of said first and second optical sensors.

44. An apparatus according to claim 42, wherein the spot for reproduction is larger than the spot for tracking disposed on one side of one of the information tracks.

45. An apparatus according to claim 41, wherein said means for detecting the amount of the offset detects a plurality of reproduction signals by scanning a plurality of times with the second light spot the information track on which a particular signal is recorded by the first light spot while varying the amount of the offset, and detects the amount of the offset before being varied by comparing the reproduction signals with the particular signal.

46. An apparatus according to claim 41, wherein said means for detecting the amount of the offset detects a plurality of reproduction signals by scanning the information track on which the information is recorded by the first light spot a plurality of times with the second light spot while varying the amount of the offset, and detects the amount of the offset when one of the reproduction signals which is greatest in signal amplitude is detected.

47. An apparatus according to claim 41, wherein said optical system includes an objective lens for condensing the first and second light beams on the medium, and wherein said actuator moves said objective lens in the tracking direction in conformity with the tracking signal.

* * * * *

UNITED STATES PATENT AND TRADEMARK OFFICE
CERTIFICATE OF CORRECTION

PATENT NO. : 5,293,366
DATED : March 8, 1994
INVENTOR(S) : SHINICHI OHTA

It is certified that error appears in the above-identified patent and that said Letters Patent is hereby corrected as shown below:

On the title page:

AT [30] FOREIGN APPLICATION PRIORITY DATA

"July 27, 1990 [JP] Japan ..... 2-196104" should read
--July 26, 1990 [JP] Japan ..... 2-196104--.

SHEET 5 OF 11

FIG. 6, "RECIEVED" should read --RECEIVED--.

COLUMN 1

Line 25, "Particularly," should read
--Particularly, the use of--.

COLUMN 3

Line 13, "lights" should read --light--.
Line 14, "lights 111" should read --light 111--.
Line 21, "situated" should read --situated in--.
Line 29, "the," should read --the--.
Line 39, "be the" should read --be said--.

COLUMN 4

Line 42, "whereinduring" should read --wherein during--.

COLUMN 5

Line 45, "DRAWING" should read --DRAWINGS--.

UNITED STATES PATENT AND TRADEMARK OFFICE
CERTIFICATE OF CORRECTION

PATENT NO. : 5,293,366
DATED : March 8, 1994
INVENTOR(S) : SHINICHI OHTA

It is certified that error appears in the above-identified patent and that said Letters Patent is hereby corrected as shown below:

COLUMN 7

Line 51, "passes" should read --pass--.

COLUMN 10

Line 53, "$(m_2-m_1)\Delta,$" should read --$(m_2-m_1)/\Delta,$--.

COLUMN 11

Line 4, "of" should read --of the determination of--.

COLUMN 13

Line 32, "with" should read --while--.

COLUMN 14

Line 6, "an" should read --and--.

COLUMN 15

Line 28, "respective," should read --respectively,--.
Line 42, "the" should read --a--.
Line 43, "a" should read --the--.

UNITED STATES PATENT AND TRADEMARK OFFICE
CERTIFICATE OF CORRECTION

PATENT NO.   : 5,293,366
DATED        : March 8, 1994
INVENTOR(S)  : SHINICHI OHTA It is certified that error appears in the above-identified patent and that said Letters Patent is hereby corrected as shown below:

COLUMN 17

Line 34, "form" should read --from--.
Line 39, "tack" should read --track--.

COLUMN 18

Line 16, "wit" should read --with--.
Line 64, "claim 33," should read --claim 35,--.

COLUMN 19

Line 21, "mans" should read --means--.
Line 54, "form" should read --from--.

Signed and Sealed this

Thirty-first Day of January, 1995

Attest:

BRUCE LEHMAN

Attesting Officer

Commissioner of Patents and Trademarks